US006957231B1

(12) United States Patent
Lubbers et al.

(10) Patent No.: US 6,957,231 B1
(45) Date of Patent: Oct. 18, 2005

(54) SYSTEM AND METHOD OF SPECIFYING AND EDITING ALT ATTRIBUTES

(75) Inventors: Jedidja Lubbers, Oregon House, CA (US); Darren McBurney, San Francisco, CA (US); Karen Masterson, Hillsborough, CA (US)

(73) Assignee: Oracle International Corporation, Redwood Shores, CA (US)

( * ) Notice: Subject to any disclaimer, the term of this patent is extended or adjusted under 35 U.S.C. 154(b) by 371 days.

(21) Appl. No.: 10/173,324

(22) Filed: Jun. 17, 2002

(51) Int. Cl.[7] ............................................. G06F 17/30
(52) U.S. Cl. ..................... 707/104.1; 707/10; 707/203; 715/513
(58) Field of Search ............................... 707/104.1, 10, 707/100, 200–203; 709/203, 219; 715/513

(56) References Cited

U.S. PATENT DOCUMENTS

| | | | |
|---|---|---|---|
| 5,870,759 A * | 2/1999 | Bauer et al. ................. | 707/201 |
| 6,009,441 A * | 12/1999 | Mathieu et al. .............. | 715/516 |
| 6,581,061 B2 * | 6/2003 | Graham ........................ | 707/10 |
| 2002/0035580 A1 * | 3/2002 | Tanabe ........................ | 707/513 |
| 2002/0046245 A1 * | 4/2002 | Hillar et al. ................. | 709/205 |
| 2002/0069204 A1 * | 6/2002 | Kahn et al. .................... | 707/10 |
| 2004/0139483 A1 * | 7/2004 | Kim et al. ................... | 725/138 |
| 2004/0148568 A1 * | 7/2004 | Springer ...................... | 715/513 |

OTHER PUBLICATIONS

A.J.Flavell and Glasgow University, Use of Alt Texts in IMGS, Internet Google, last updated Apr. 1999, pp. 1 of 20.*
A.J.Flavell and Glasgow University, Use of Alt Texts in IMGS, Internet Google, last changed Feb. 8, 2004, pp. 1 of 21.*
SitePoint Forums: I want alt tags for my buttons, please help! vBulletin v3.0.3, by Jelsoft Enterprises Ltd., intenet Google, on Apr. 8, 2002, pp. 1 of 3.*
Laura Lernay, Teach yourself Web Publishing with HTML 4 in 21 Days, by Sams Publisning, 1999, pp. 199-200.*

* cited by examiner

Primary Examiner—John E. Breene
Assistant Examiner—Debbie M. Le
(74) Attorney, Agent, or Firm—Wagner, Murabito & Hao LLP

(57) ABSTRACT

A computer implemented method for updating alt attribute values in a data set. The application includes a file server for storing one or more file sets. The server is communicatively coupled to an attribute engine. The attribute engine is also communicatively coupled to an attribute database, wherein image data from the file sets are stored. The attribute database is communicatively coupled to a browser via an attribute portal, wherein an editor can edit alt attribute text values. The attribute engine updates the image data contained in the attribute database, based upon data of images in the file set. The attribute engine also updates the file set based upon the alt attribute values in the attribute database. Thus an editor can add or change alt attribute values in the file set via a browser.

17 Claims, 18 Drawing Sheets

COMPONENT TABLE PROPERTIES — 310

| FIELDS | NULL? | TYPE | CONSTRAINTS |
|---|---|---|---|
| INTERNAL COMP ID | NOT NULL | NUMBER | PRIMARY KEY |
| FILE SET NAME | NOT NULL | VARCHAR2 | |
| FILE SET VERSION | NOT NULL | VARCHAR2 | |
| FILE SET LOCATION | NOT NULL | VARCHAR2 | |
| OWNER | | VARCHAR2 | |
| DESCRIPTION | | VARCHAR2 | |

315 — FILE SET NAME
325 — FILE SET VERSION
335 — FILE SET LOCATION
345 — OWNER
355 — DESCRIPTION

COMPONENT TABLE

| INTERNAL COMP ID | FILE SET NAME | FILE SET VERSION | FILE SET LOCATION | OWNER | DESCRIPTION |
|---|---|---|---|---|---|
| 1 | XYZ CORP WEB SITE | 8.0 | NET/WEBDOC | | |
| 2 | PRODUCT A HELP SET | 2.0 | TOOL/HELP/A.2.0 | | |
| 3 | PRODUCT A HELP SET - FRENCH | 2.1 | TOOL/HELP/A.2.1 | | |
| 4 | PRODUCT A HELP SET - GERMAN | 2.2 | TOOL/HELP/A.2.2 | | |
| 5 | PRODUCT B HELP SET | 1.0 | TOOL/HELP/B.1.0 | | |
| 6 | PRODUCT B HELP SET - FRENCH | 1.1 | TOOL/HELP/B.1.1 | | |
| 7 | PRODUCT B HELP SET - GERMAN | 1.2 | TOOL/HELP/B.1.2 | | |

IMAGE TABLE PROPERTIES — 330

| FIELDS | NULL? | TYPE | CONSTRAINTS |
|---|---|---|---|
| IMAGE FILE NAME | NOT NULL | VARCHAR2 | COMPOSITE PRIMARY KEY |
| INTERNAL COMP ID | NOT NULL | NUMBER | FOREIGN KEY / COMPOSITE PRIMARY KEY — 350 |
| IMAGE URL | NOT NULL | VARCHAR2 | |
| NUM REFERENCE | NOT NULL | NUMBER | |
| CONTEXT URL | NOT NULL | VARCHAR2 | |
| ALT TEXT | | VARCHAR2 (60) | |
| LONG DESC | | VARCHAR2 | |
| DATE CREATED | | DATE | |
| REDUNDANT ID | NOT NULL | VARCHAR2 (1) | |

IMAGE TABLE — 340

| IMAGE FILE NAME | INTERNAL COMP ID | IMAGE URL | NUM REFERENCE | CONTEXT URL | ALT TEXT | LONG DESC | DATE CREATED | REDUNDANT ID |
|---|---|---|---|---|---|---|---|---|
| A0001.GIF | 2 | ~ | ~ | ~ | ~ | | | ~ |
| A0002.GIF | 2 | ~ | ~ | ~ | ~ | | | ~ |
| A0003.GIF | 2 | ~ | ~ | ~ | ~ | | | ~ |
| A0004.GIF | 2 | ~ | ~ | ~ | ~ | | | ~ |
| W0059.GIF | 1 | ~ | ~ | ~ | ~ | | | ~ |
| A0005.GIF | 2 | ~ | ~ | ~ | ~ | | | ~ |
| B0001.GIF | 5 | ~ | ~ | ~ | ~ | | | ~ |

FIGURE 3B

TRANSLATION TABLE PROPERTIES

| FIELDS | NULL? | TYPE | CONSTRAINTS |
|---|---|---|---|
| ALT TEXT | | VARCHAR2 (60) | FOREIGN KEY |
| TRANSLATION ID | NOT NULL | NUMBER | PRIMARY KEY |
| FRENCH | | VARCHAR2 (60) | |
| GERMAN | | VARCHAR2 (60) | |

TRANSLATION TABLE

| ALT TEXT | TRANSLATION ID | FRENCH | GERMAN |
|---|---|---|---|
| 〜 | 1 | 〜 | |
| 〜 | 2 | 〜 | |
| 〜 | 3 | 〜 | |
| 〜 | 4 | 〜 | |
| 〜 | 5 | 〜 | |
| 〜 | 6 | 〜 | |
| 〜 | 7 | 〜 | |

FIGURE 3C

| LANGUAGE TABLE PROPERTIES | | | |
|---|---|---|---|
| FIELDS | NULL? | TYPE | CONSTRAINTS |
| LANGUAGE ID | NOT NULL | NUMBER | PRIMARY KEY |
| LANGUAGE NAME | | VARCHAR2 (60) | |
| LANGUAGE CODE | | VARCHAR2 (60) | |

LANGUAGE TABLE

| LANGUAGE ID | LANGUAGE NAME | LANGUAGE CODE |
|---|---|---|
| 1 | FRENCH | ~ |
| 2 | GERMAN | ~ |

FIGURE 3D

FILE SET REPORT 805

| COMPONENT 810 | VERSION 815 | FILE LOCATION 820 | OWNER 825 | RUN REPORT 830 |
|---|---|---|---|---|
| REPORT | 9i | /home/aaa/report | jdoe | Click Here |
| PORTAL | 9.0.2 | /home/aaa/portal | sbrown | Click Here |
| DEMO | 1.0.1 | /home/aaa/demo | jdoe | Click Here |

RUN REPORT — 845

| RUN 850 | ERRORS 855 | DETAIL REPORT 860 |
|---|---|---|
| PORTAL RESULTS 04-APR-2002 17:34:03 | 7 | Click Here |
| PORTAL RESULTS 14-APR-2002 11:34:02 | 0 | Click Here |
| PORTAL RESULTS 24-APR-2002 16:17:55 | 18 | Click Here |
| PORTAL RESULTS 04-MAY-2002 15:57:59 | 255 | Click Here |

DETAIL REPORT —870

RUN: PORTAL 04-APR-2002 17:34:03

MISSING IMAGES

FOO.GIF
ABC.JPG

REDUNDANT IMAGES

OLD.GIF
BETA.GIF

NO ALT TEXT SPECIFIED

| FILE | LINE | ENTER ALT TEXT | IMAGE REFERENCE |
|---|---|---|---|
| HOME.HTM | 8 | Click Here | LOGO.JPG |
| PURCHASE.HTM | 222 | Click Here | NEW.GIF |

ALT TEXT MORE THAN 60 CHARACTERS

| File | LINE | ALT TEXT VALUE | IMAGE REFERENCE |
|---|---|---|---|
| FOO.HTM | 64 | DESCRIPTION NEVER ENDS, ON AN | LONG.GIF |

ALT TEXT IS THE SAME AS THE IMAGE FILE NAME

| FILE | LINE | ALT TEXT VALUE | IMAGE REFERENCE |
|---|---|---|---|
| SAMEONE.HTM | 435 | SAME | SAME.GIF |
| ALPHA.HTM | 21 | ABCDEF | ABCDEF.GIF |

FIGURE 7C

SYSTEM AND METHOD OF SPECIFYING AND EDITING ALT ATTRIBUTES

FIELD OF THE INVENTION

The present invention relates to "alt attributes" in hyper text markup language (HTML) documents, and more particularly to automated creation, editing, and management of alternative text for images in HTML documents.

BACKGROUND OF THE INVENTION

Hyper Text Markup Language (HTML) is the authoring language used to create documents on the world wide web. Many HTML documents make use of images as logos, hyperlinks, and the like. HTML defines the structure and layout of a web document by using a variety of tags and attributes. Generally, an alt attribute is an optional attribute that specifies alternative text for images, applets and areas in HTML documents.

The alt attribute has three purposes: First it specifies alternative text that the browser may show if image display is not possible or disabled by a user. Second, the alternative text can be read by screen reading software, so that vision impaired users can follow along. Third, some browsers display the alt attribute's text value in a text box similar to a tool tip when users pass their mouse over the image.

Typically HTML documents contain a lot of references to certain images. For example, each page might have a picture of an index, that serves as a link to the HTML page that contains the index of the entire document. This image might be used thousands of times. The author will need to specify the alt text for this image every time it occurs. Additionally, another author might create alt attributes for the same image with a different text value.

Currently, adding the alt attribute as a manual intensive process. For HTML documents containing large number of images, the process of adding alt attributes becomes more and more time consuming. For example, some HTML editors allow alt text to be added within the application itself. Each image may be selected and a dialog box opened which accepts alt attribute text. However, each and every image file throughout the HTML document must be selected and a corresponding alt attribute text specified. Furthermore, not all HTML editors currently provide for entering alt attribute text.

In addition, if the HTML was not authored in the same editor as the one used to add the alt attribute, then the editor might be adding a lot of its own proprietary HTML codes to the document. For example in Microsoft Word, a simple four-line HTML document could easily span two full pages once the document is saved. On top of that, Microsoft Word will move the images to a new location, which is not at all what a editor might want.

Alternatively, if the editor does not have a HTML editor which supports adding alt attributes, the editor may need to open each HTML file in a text editor. However, the editor cannot see the image in the text editor. Therefore, the editor may need to open the image file in an image viewer application, in order to determine an appropriate alt text descriptive of the image. The editor can then hand code the HTML alt attribute using the text editor. Although the original HTML source code is preserved, the editor must use multiple applications and perform multiple steps for each and every image throughout the HTML File. Thus the process becomes slow and cumbersome.

Another problem with the current method of adding alt attributes arises when the HTML document is translated. The alt text will not be picked up as a translatable piece of content, because the alt attribute is part of an HTML tag. Thus, one will always have an English alt text unless the HTML file is translated entirely. Therefore, when the HTML document is translated, the translator must open each file containing an image individually and translate the alt attribute tag itself. While, typically translations are done on a dollar amount per word basis. The opening of all the files and translation the alt attribute is done on an hourly basis and can get very expensive, because of the additional time required to open each image and the inability to apply a translation memory tool. Furthermore, versions of the software might not be available to perform the work, thus complicating the process and typically resulting in high costs and delays.

Yet another problem with the current method arises with regard to maintenance of the HTML document. As the HTML document is updated, new images may be inserted. There is no mechanism that will flag the newly added images that need an alt attribute. This means that periodically the help set must be checked for missing alt attributes, doubling or tripling the amount of work required to keep the files current. This can also apply to new releases of the same documents for different versions of a product.

Thus the need exists for being able to specify alt attribute text once for each and every occurrence of a particular image in a file set. The need also exists for being able to only update the alt attribute value in the HTML source code. The need also exists for creating a highly productive browser-based front-end that provides the editor with all the data that is needed for creating, editing, and managing alt attributes. Furthermore, the need also exists for providing a superior, highly scaleable, translation extension.

SUMMARY OF THE INVENTION

The present invention provides a method for specifying alt attribute text once for each and every occurrence of a particular image in a file set. The present invention also provides an HTML file integrity analyzer, ensuring that alt attributes are specified for each image, and enforcing various conventions, and improving consistency throughout the HTML file. The present invention also provides the ability to only update the alt attribute value in the HTML source code. The present invention also provides a highly productive browser-based editor with all the data that is needed to creating, editing, and managing alt attributes. Furthermore, the present invention also provides a superior, highly scaleable, translation extension.

The present invention, in accordance with one embodiment, provides an easy to use computer implemented method for updating alt attribute values in a data set. The application includes a file server for storing one or more file sets. The server is communicatively coupled to an attribute engine. The attribute engine is also communicatively coupled to an attribute database, wherein image data (metadata) from the file sets are stored. The attribute database is communicatively coupled to a browser via an attribute portal. The attribute engine updates the image data contained in the attribute database, based upon data of images in the file set. The attribute engine also updates the file set based upon the alt attribute values in the attribute database. Thus an editor can add or change alt attribute values in the file set via a browser.

BRIEF DESCRIPTION OF THE DRAWINGS

The present invention is illustrated by way of example and not by way of limitation, in the figures of the accompanying drawings and in which like reference numerals refer to similar elements and in which:

FIGS. 3A–3D are diagrams of an attribute database in accordance with one embodiment of the present invention.

FIGS. 7A–7C comprise a user interface for displaying and navigating a run report in accordance with one embodiment of the present invention.

DETAILED DESCRIPTION OF THE INVENTION

Reference will now be made in detail to the embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail as not to unnecessarily obscure aspects of the present invention.

In one embodiment, the present invention is implemented as an alt attribute application for specifying alt attribute text values. The alt attribute application readily provides for adding the alt attribute text values by automating the entire process in an innovative, web-based way. The alt attribute application provides an editor all the necessary information right in a browser. Furthermore, the alt attribute application is an effective file set integrity analyzer. The alt attribute application ensures that all images have an alt attribute specified, and the uniform application of alt attribute text values to each image in a file set.

Figure 1:
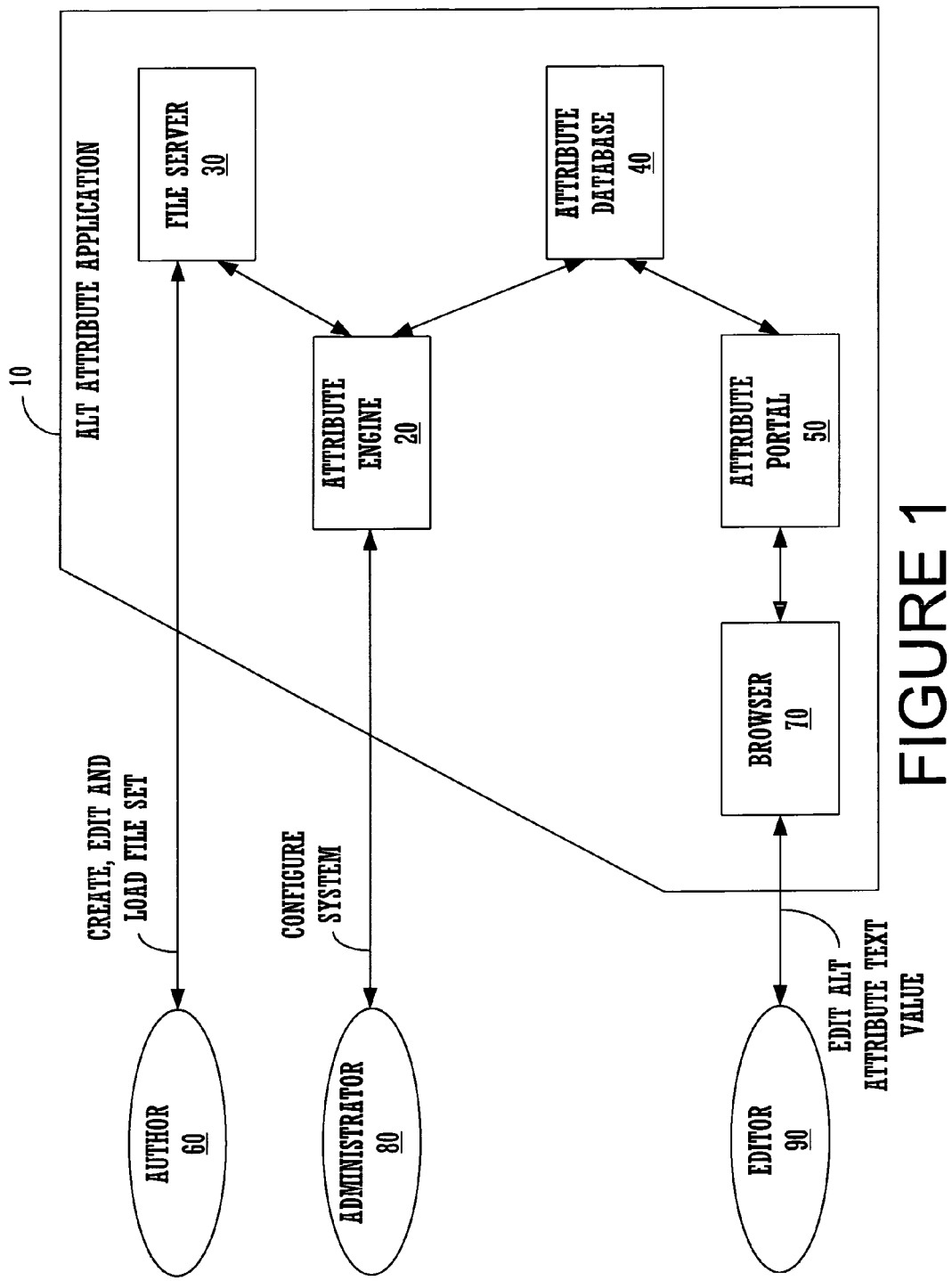
FIG. 1 is a diagram of an alt attribute application in accordance with one embodiment of the present invention.

Referring now to FIG. 1, a diagram of an alt attribute application 10 in accordance with one embodiment of the present invention. As depicted in FIG. 1, the alt attribute application includes an attribute engine 20 communicatively coupled to a file server 30 and an attribute database 40. Furthermore, the attribute database 40 is communicatively coupled to a browser 70, via an attribute portal 50.

The attribute portal 50 provides a graphical user interface for editing the content of the attribute database 40. More specifically, the graphical user interface allows editors 90 to view image data contained in the attribute database 40 and to edit existing alt attribute text values or add alt attribute text values, therein.

The file server 30 may be a regular file system, central file server, source control file system, VOB file server, or the like, which are herein referred to as file servers. The file server 30, stores one or more file sets. More specifically, the file server 30 stores one or more electronic documents, such as hyper text markup language (HTML) documents, standard generalized markup language (SGML) documents, java server pages (JSP), active server pages (ASP), help sets, web sites, web pages, software applications, electronic manuals, online help, and the like, which are herein referred to as file sets. Each file set is typically comprised of one or more files. For example, a file set may be an HTML multi-page document. Each page of the HTML document is a separate file in the file set. Furthermore, each page may refer to one or more image files, applet files, area tag files, multimedia files, and the like, which are herein referred to as image files.

The attribute engine 20 synchronizes the image data of file sets contained on the file server 30 with the image data in the attribute database 40. More specifically, the attribute engine 20 runs and goes out to a specified file set location and checks each file looking for image file references in the HTML code and the presence or absence of corresponding alt attributes. The attribute engine 20 checks if data for each image file is listed in the attribute database 40. If the data for a particular image file is listed, the attribute engine 20 updates the image data contained in the attribute database 40, based upon the image file data contained in the particular file set. If an image file is not in the attribute database 40, the attribute engine 20 gathers the image data from the file set and writes it to the attribute database 40. The attribute engine 20 also updates the particular file set contained on the file server 30 based upon the corresponding alt attribute text value contained in the attribute database 40. Thus the attribute engine 20 must have read and write permission to the file server 30 that contains the file set.

In an alternative feature of the present invention, the attribute engine 20 is configurable by an administrator 80. The administrator 80 identifies the location of the file sets on the file server 30. The administrator also specifies a schedule for execution of the processes performed by the attribute engine 20.

Figure 2:
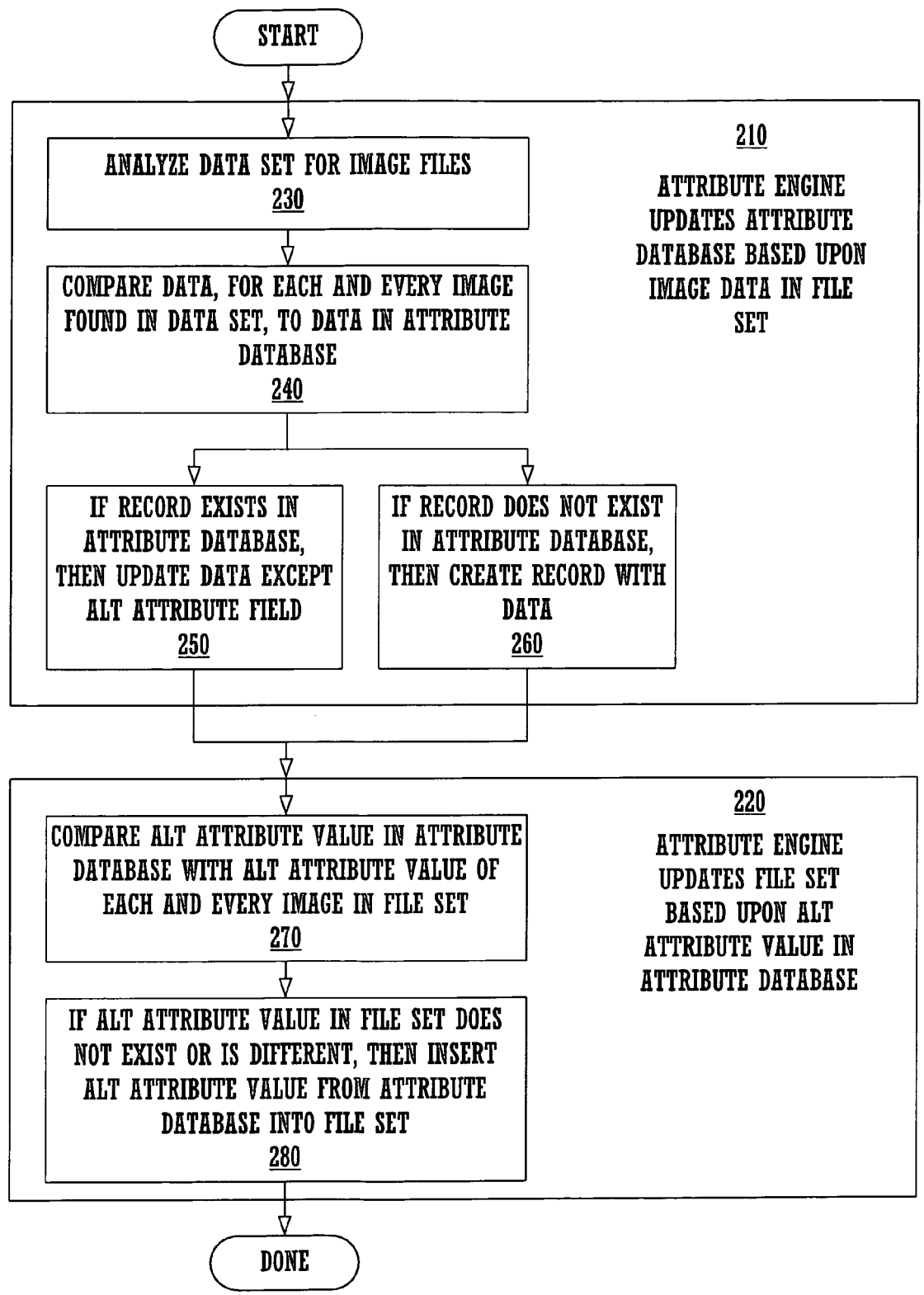
FIG. 2 is a flow diagram of a process performed by an attribute engine in accordance with one embodiment of the present invention.

Referring now to FIG. 2, a flow diagram of a process performed by an attribute engine in accordance with one embodiment of the present invention. As shown in FIG. 2, the attribute engine updates an attribute database, based upon image data in a file set 210. The attribute engine then updates the file set, based upon alt attribute text in the attribute database 220.

More specifically, the attribute engine analyzes the data set contained on a file server, at step 230. The analysis looks for each and every image file referenced in the file set. For each image file reference in the file set, the attribute engine check to see if there is a corresponding record in the attribute database, step 240.

If a record corresponding to the particular image exists, the attribute engine updates one or more fields in the record, step 250. If a record corresponding to the particular image does not exists, the attribute engine adds a record for the image and populates the fields with the data of the particular image, step 260.

The attribute engine then compares the alt attribute text value contained in the attribute database with the alt attribute of each and every occurrence of the corresponding image file reference in the file set, step 270. If the alt attribute text value in the file set does not exist or is different from the alt attribute text value contained in the attribute database, then the attribute engine updates the file set for each and every corresponding image, step 280.

The above process performed by the attribute engine is further illustrated by way of the following examples. In the first example, the file set has just been loaded onto the file server by an author. The file set contains no alt attribute text. Furthermore, the attribute database contains no data. The attribute engine looks for each and every image file reference contained in the file set 230. For each image file reference in the file set, the attribute engine checks to see if there is a corresponding record in the attribute database table 240. However, there is no image data in the attribute database table. Therefore, the attribute engine adds a record for each image and populates the fields with the corresponding data of the image 260.

In the next example, the file set is periodically updated, by the author, to contain new images. In one case a new image file reference has been added to the file set. In such case, the attribute engine analyzes the data set and finds the new image file reference 230. The attribute engine then check to see if there is a corresponding record in the attribute database table 240. However, there is no record in the attribute database table, because it is a newly added image. Therefore, the attribute engine adds a record for the image and populates the fields with the data of the particular image 260.

In another case, an image file reference that already exists in at least one file in the file set is added to another file in the file set. In such case, the attribute engine analyzes the data set and finds the image file reference in an additional file of the file set 230. The attribute engine then checks to see if there is a corresponding record in the attribute database table 240. There is a record in the attribute database table, because the image file reference already existed in the file set and was previously included in the attribute database. Therefore, the attribute engine updates one or more fields in the record 250. For example, the attribute engine will increment the field for the record that contains the number of times the image appears in the file set.

In another example, an editor periodically adds or changes alt attribute text values in the attribute database. In one case, the attribute database originally did not contain alt attribute text for a particular image. The appropriate alt attribute text is added by an editor. In such case, the attribute engine compares the alt attribute text value contained in the attribute database with the alt attribute of each occurrence of the corresponding image file reference in the file set 270. The attribute engine updates the file set for each and every occurrence of the corresponding image 280, because the alt attribute text value in the file set did not previously exist in the file set.

In yet another case, the attribute database originally contained alt attribute text for a particular image. However, the alt attribute text is modified by the editor. In such case, the attribute engine compares the alt attribute text value contained in the attribute database with the alt attribute of each occurrence of the corresponding image in the file set 270. The attribute engine updates the file set with the edited alt attribute text value for each and every occurrence of the corresponding image 280, because the alt attribute text value in the file set is different.

In one configuration of the above-described embodiment, the data, with the exception of the alt attribute text value, contained in the file set is considered the source of truth. Hence, the data contained in the file set is used to update all fields, except for the alt attribute field, in the attribute database. For the alt attribute text value, the attribute database is the source of truth. Thus, the alt attribute text value in the attribute database is used to update the file set. There is however one exception concerning alt attribute text values. If a file is updated to have an alt attribute text value, and the database does not have anything, the alt attribute field in the attribute database will be updated based upon the alt text value in the file set.

In an alternative feature of the present invention, the attribute engine performs the above described process periodically based upon a schedule specified by an administrator. In another embodiment of the feature, the attribute engine performs the process as a constant looping function. In yet another embodiment of the feature, the process is executed by the attribute engine upon command.

Referring now to FIGS. 3A–3D, a diagram of an attribute database, in accordance with one embodiment of the present invention is shown. The attribute database contains one or more tables. In one such embodiment, the attribute database contains a component table, as shown in FIG. 3A, and a file table, as shown in FIG. 3B. The component table contains various configuration data concerning the file sets located on the file server. The file table contains data concerning the image files contained or referenced in the file sets.

More specifically, the component table is comprised of various fields, such as: internal component identification, file set name, file set version, file set location, owner, description, and the like 310. Each file set is listed as a record 320 in the component table.

The image table is comprised of various fields, such as: image file name, internal component identification, image file URL, number of times referenced, context URL, alt text value, long description value, date created, redundant identification (used to identify if an image file referenced in the file set is actually used or not), and the like 330. Each image in a particular file set is listed as a record 340 in the corresponding file table.

In an alternative feature of the present invention, the attribute database can limit the maximum character length of the alt attribute text value. Normally, the text value for alt attributes can be 1024 characters long. However, there are reasons for further limiting the length of the alt attribute text value. For example, the Federal Rehabilitation Act and/or Web Content Accessibility Guidelines requires compliant software to have alt attribute text no longer than 60 characters. Therefore, an input mask for the alt attribute field of the attribute database can be applied to limit the character length of the alt attribute text value 350.

In another alternative feature of the present invention, the attribute database can be extended to be a translation interface. In such an embodiment, the attribute database also contains a translation table, as shown in FIGS. 3C–3D. The translation table is comprised of an alt text (native language) field 360, and various translation language (i.e. French, German, etc.) fields 370. Each alt attribute text value is listed as a record 380 in the translation table.

In one implementation, a translator selects the language to be translated into. A corresponding field 370 is added to the translation table for the desired language. For example, a translator may choose to translate the native language alt text to French. Thus, a French field is added to the translation table. The field can be pre-populated with the native language alt attribute text value. The native language alt attribute text value for a particular image is then displayed. The translator then translates the alt attribute text value, which is saved to the appropriate translation language field for the particular alt attribute value.

In another implementation, a translatable resource bundle, in for example an XML format, is created from the attribute database. The translatable resource bundle comprises the internal component identification, the image file, and alt attribute text value. The translatable resource bundle provides for translation utilizing translation memory tools. Once the translation is completed, the XML file can be imported back into the appropriate translation language field for the particular alt attribute text value.

Figure 4:
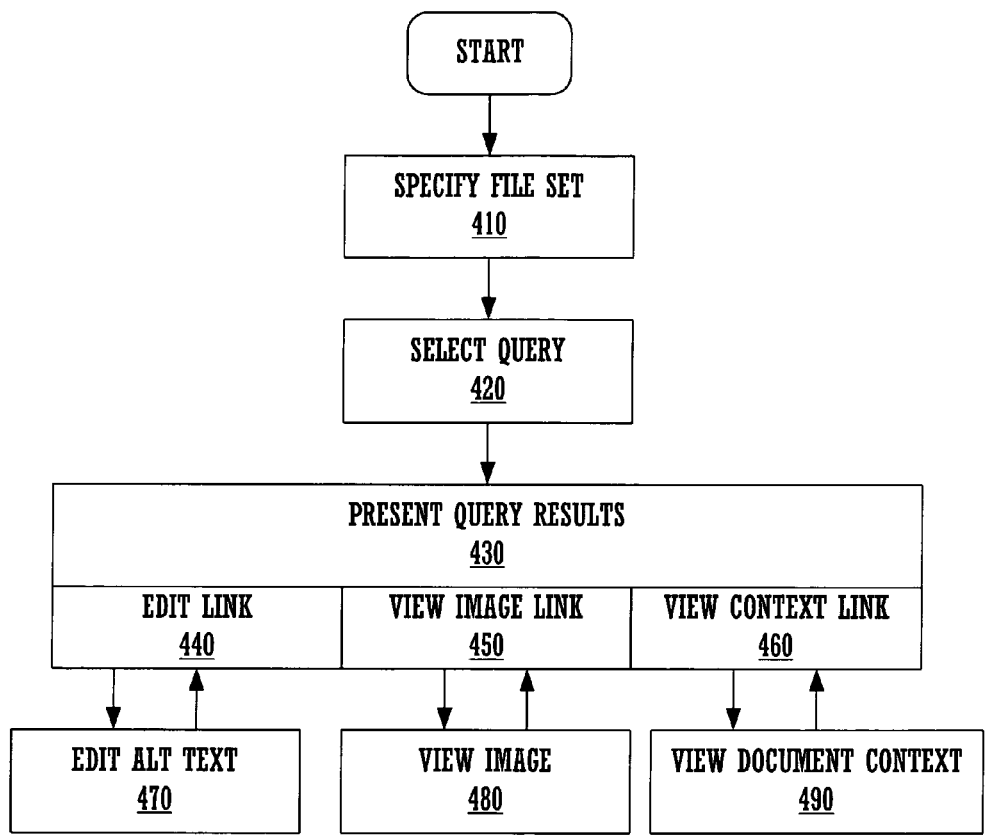
FIG. 4 is a flow diagram of a process flow between an attribute database and an editor in accordance with one embodiment of the present invention.

Referring now to FIG. 4, is a flow diagram of the process flow between an attribute database and an editor, in accordance with one embodiment of the present invention. The process flow represents the method by which the editor can add or change the alt attribute text value.

At step 410, as shown in FIG. 4, the editor specifies a file set in which alt attribute text needs to be added or changed. The editor then selects a query at step 420. The query is used to sort, filter, and the like, image data according to desired characteristics. For example, a query may find all image files that have no alt attributes specified, those that do have alt attributes specified, or those that match a particular pattern so that a particular image or alt attribute can be located, and the like.

The query results are then presented at step 430. The query results provide the editor with information such as a link to the image file 450, a link to the file in the file set that includes the image file 460, and the like. The query results also include a link to a means for editing the alt attribute text value 440.

The editor can therefore view the image file 480. The editor can also view a file in the file set in which the image file is specified 490, in order to see the context in which the image is used. The ability to view the image and the context in which it is used, assists the editor in creating an appropriate alt attribute text. The editor can then enter and or edit the alt attribute text contained in the attribute database 470. Thus, the present invention provide an editor all the information needed to create and edit alt attributes, right at their fingertips.

Figure 5A:
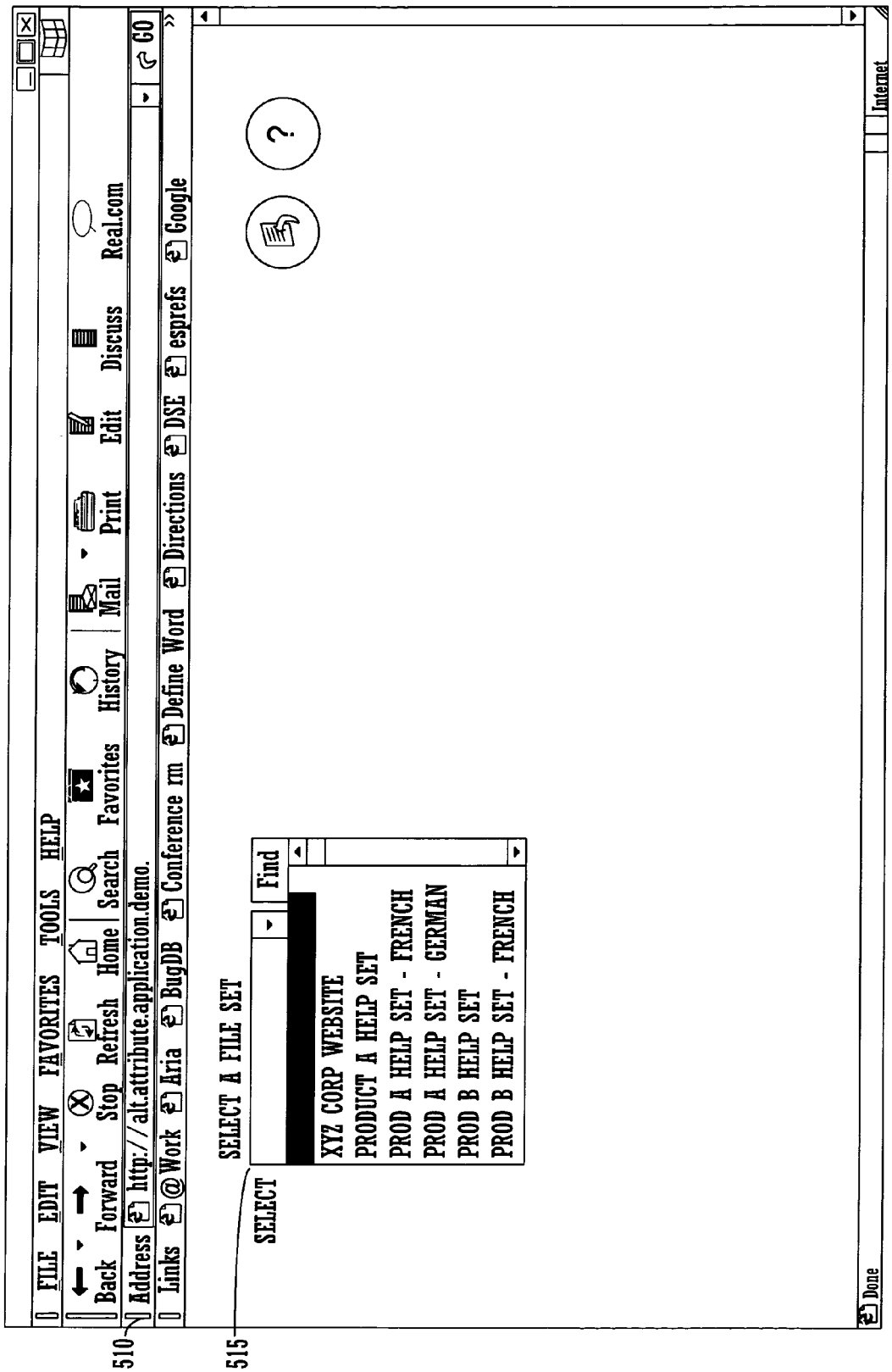
FIGS. 5A–5E comprise a graphical user interface presented to an editor in accordance with one embodiment of the present invention.

Referring now to FIG. 5A–5E, a graphical user interface presented to an editor, in accordance with one embodiment of the present invention is shown. As depicted in FIG. 5A, an editor navigates to the unique resource locator (URL) 510 that hosts the alt attribute application, using a browser. The graphical user interface then presents a dialog box from which an editor can select a file set 515 to work on.

Figure 5B:
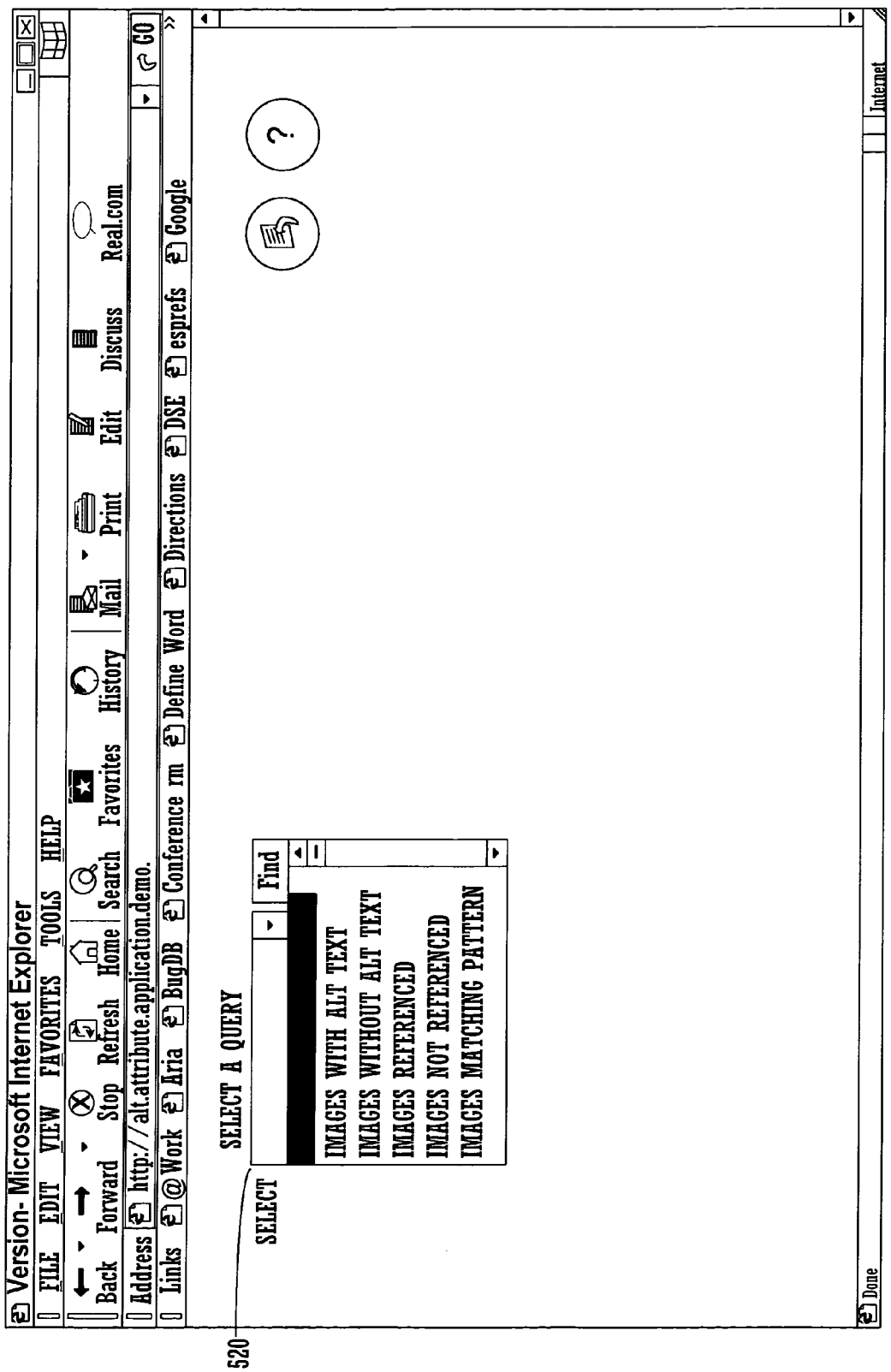

As shown in FIG. 5B, the editor will then have the ability to select from various queries, reports, and the like 520. For convenience, reference will made to queries, reports, and the like, in general as queries herein. For example, the editor can select a query such as: A query that shows all image file names in a file set that have an alt attribute specified. Such a query allows editors to edit alternative text for the images contained in the file set. Such a query also allows a translator to translate applicable alt attributes. A query that shows all the image file names in the file set that have no alt attribute specified. Such a query allows the editor to add the alternative text value for the selected images contained in the query. A query that shows all image file names in the file set that are referenced in the file set. Such a query allows the editor to identify images files that are currently referenced in the file set. A query that shows all image file names in the file set that are not referenced in the file set. Such a query allows the user to identify obsoleted images. A query that contains images, whose name matches a certain pattern.

Such a query allows the editor to drill down to a particular image quickly to edit its alt attribute. A query that shows all file names in a file set that have an alt attribute value of more than a specified length. Such a query allows the editor to enforce alt text compliant regulations, such as the Federal Rehabilitation Act and/or Web Content Accessibility Guidelines' requirement that alt text be no more than 60 characters. The masking and filtering functionality of the attribute database makes it possible to generate numerous other useful query results, like the above described.

Figure 5C:
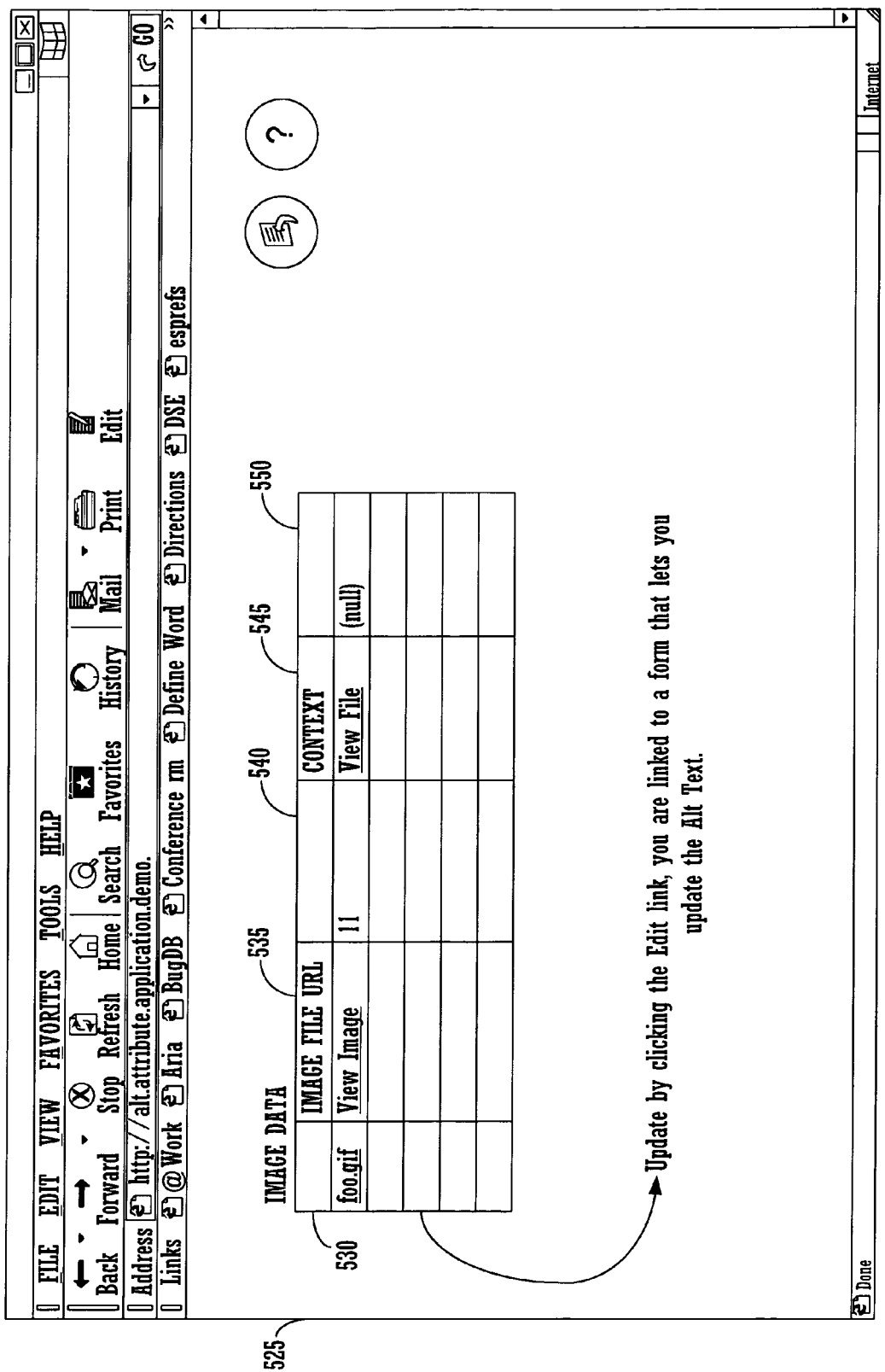

As shown in FIG. 5C, the editor is then presented with the result from the selected query 525. The query contains a number of columns, such as: The Edit column 530, which lists the file name, which is also a link to an alt attribute text entry dialog box for editing or updating the alt attribute. The Image File URL column 535, which contains a link to the actual image. By clicking on the hyperlink, the image shows in the browser. By clicking the back button in the browser, the editor returns to the query. The Num References column 540, which shows the number of time the image is referenced in the help set. This is also the number of times the editor would have to create an alt attribute for the image if the editor did not use the AAA. The Context URL column 545, which has a link to one of the files that contains the image. Typically editors would click on the hyperlink to get an idea of the context of the image. Perhaps the editor can even copy some of the description from the context file and paste it into the alt attribute field later. The Alt Text column 550, which actually displays the alt attribute text value. It will display NULL if no value is available.

Figure 5D:
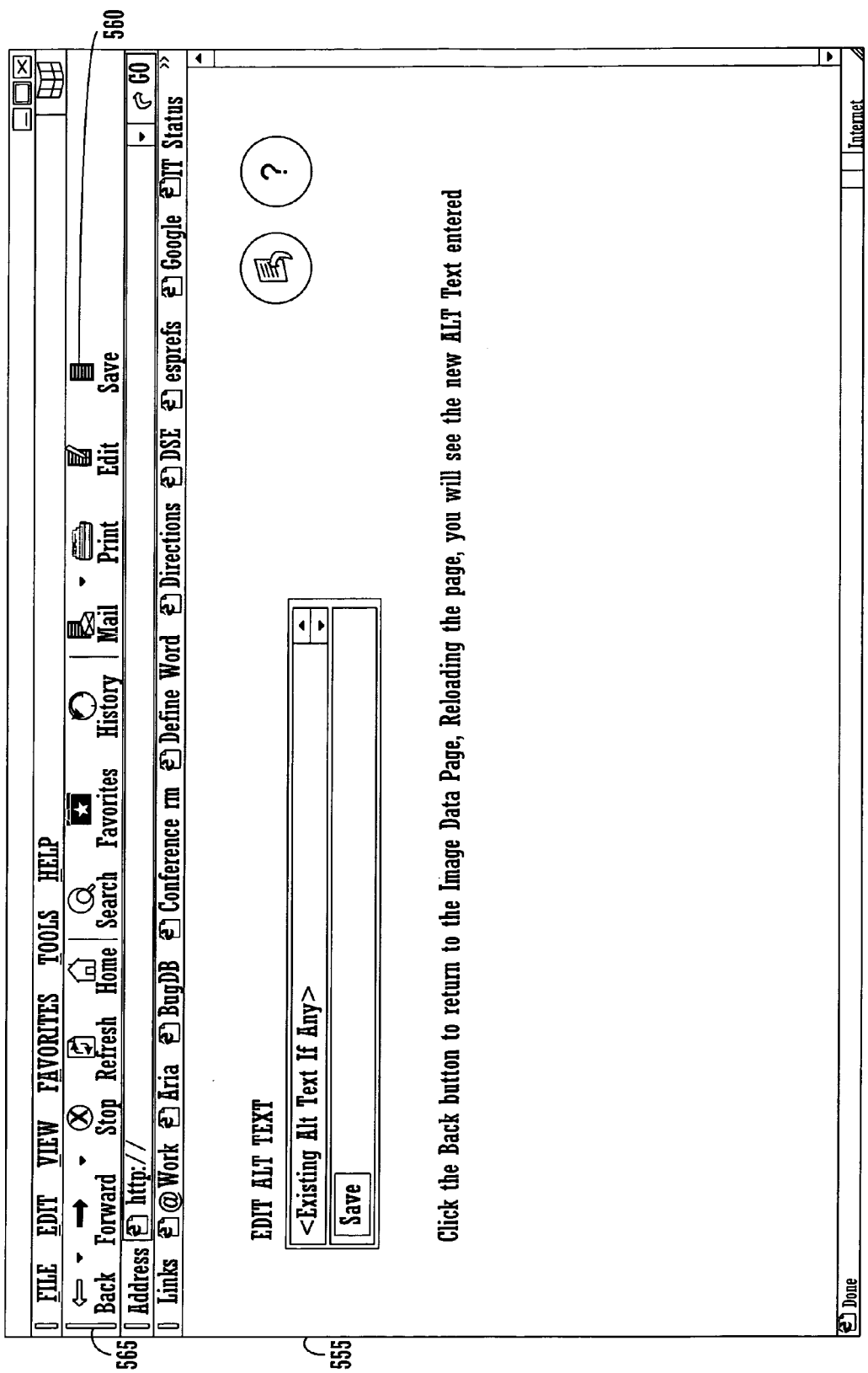

Once the editor has composed the correct alt attribute text value, the editor can click on the image filename in the edit column 535. The graphical user interface then provides an alt attribute text entry dialog box, as shown in FIG. 5D. The edit alt text dialog box 555, allows the editor to type or paste in the alt attribute text value. The editor can then click on save 560 to save the value in the database. After entering and saving the desired alt attribute text, the editor can then click on the back button 565 to return to the query.

Figure 5E:
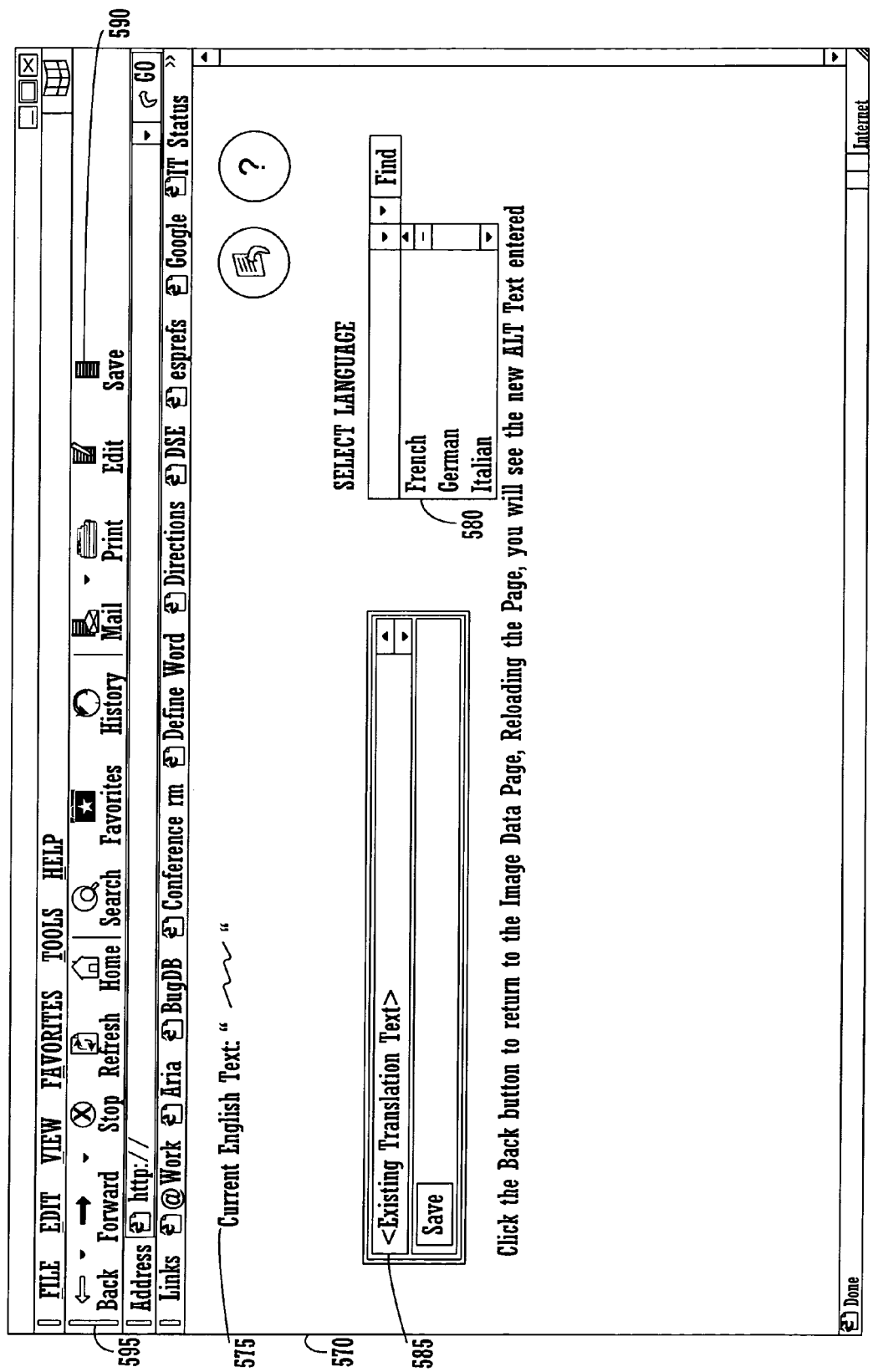

In an alternative feature of the present invention, the graphical user interface also provides an alt attribute translation dialog box, as shown in FIG. 5E. The translation dialog box 570 displays the native language text (for example English) 575, allows the translator to select a language to translate into 580, and allows the translator to type or paste in the translated alt attribute text value 585. The translator can then click on save 590 to save the value in the database. After entering and saving the desired translated alt attribute text, the translator can then click on the back button 595 to return to the query.

Figure 6A:
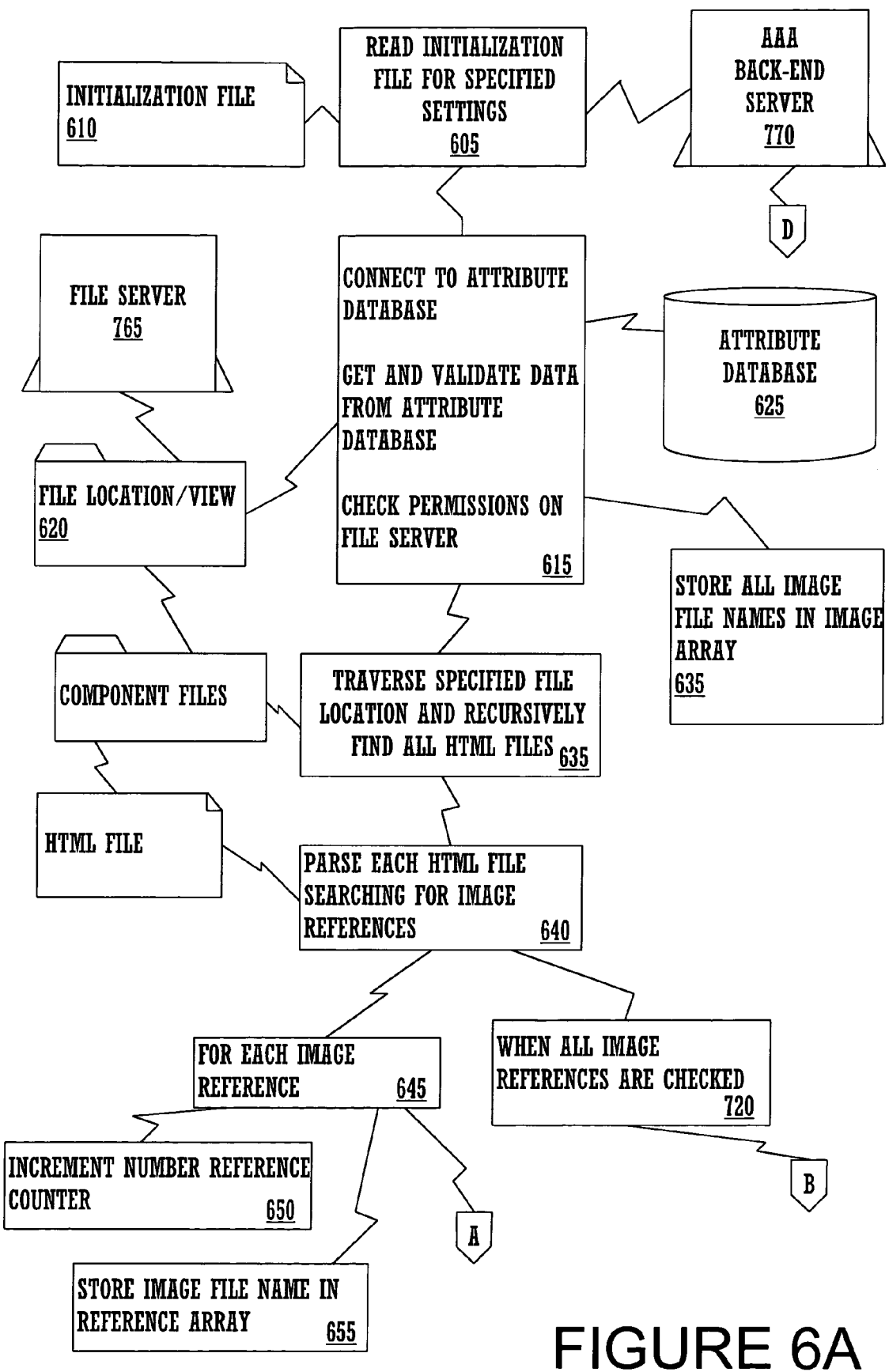
FIGS. 6A–6C is a process flow of an alt attribute application in accordance with one embodiment of the present invention.
Figure 6B:
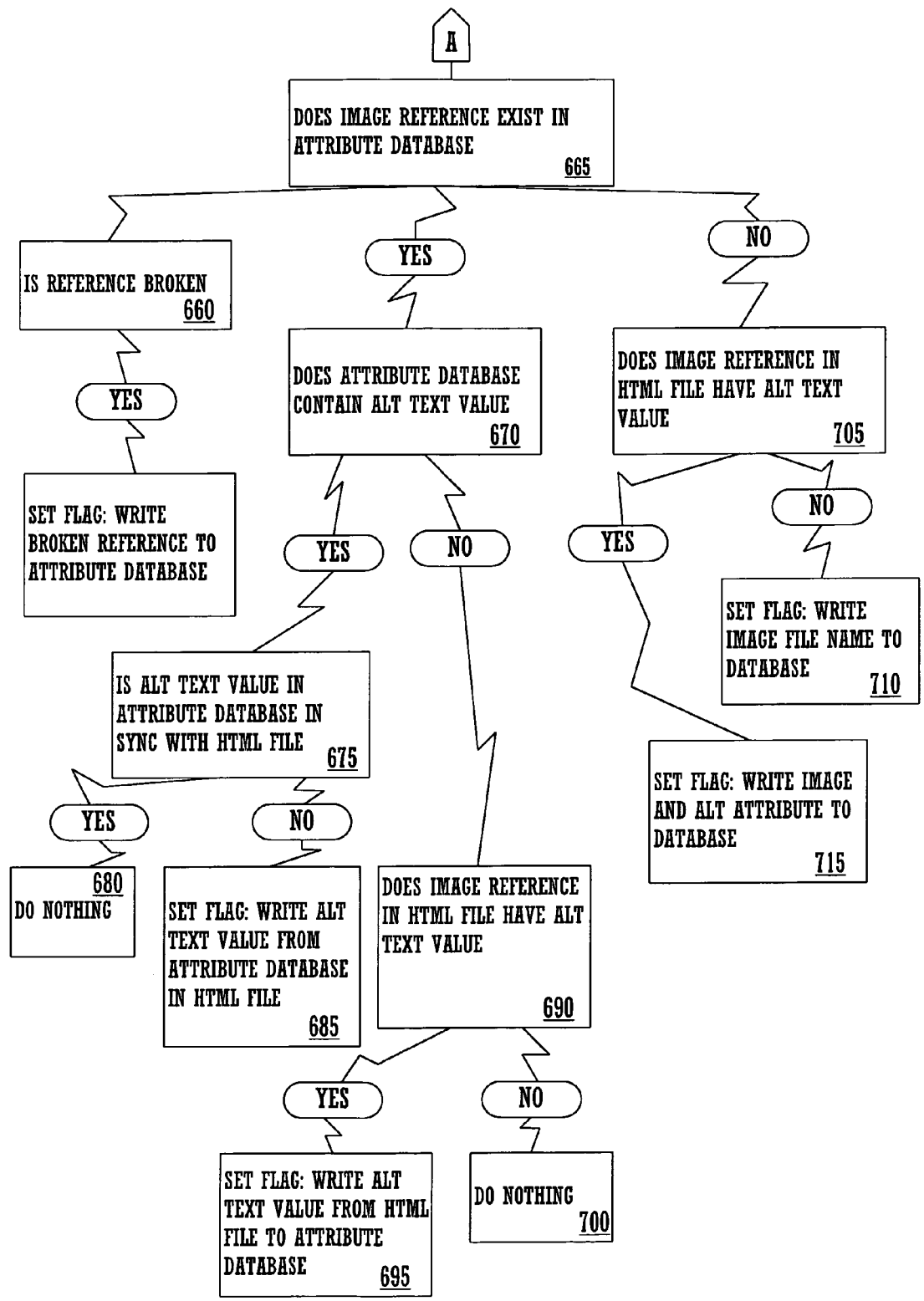
Figure 6C:
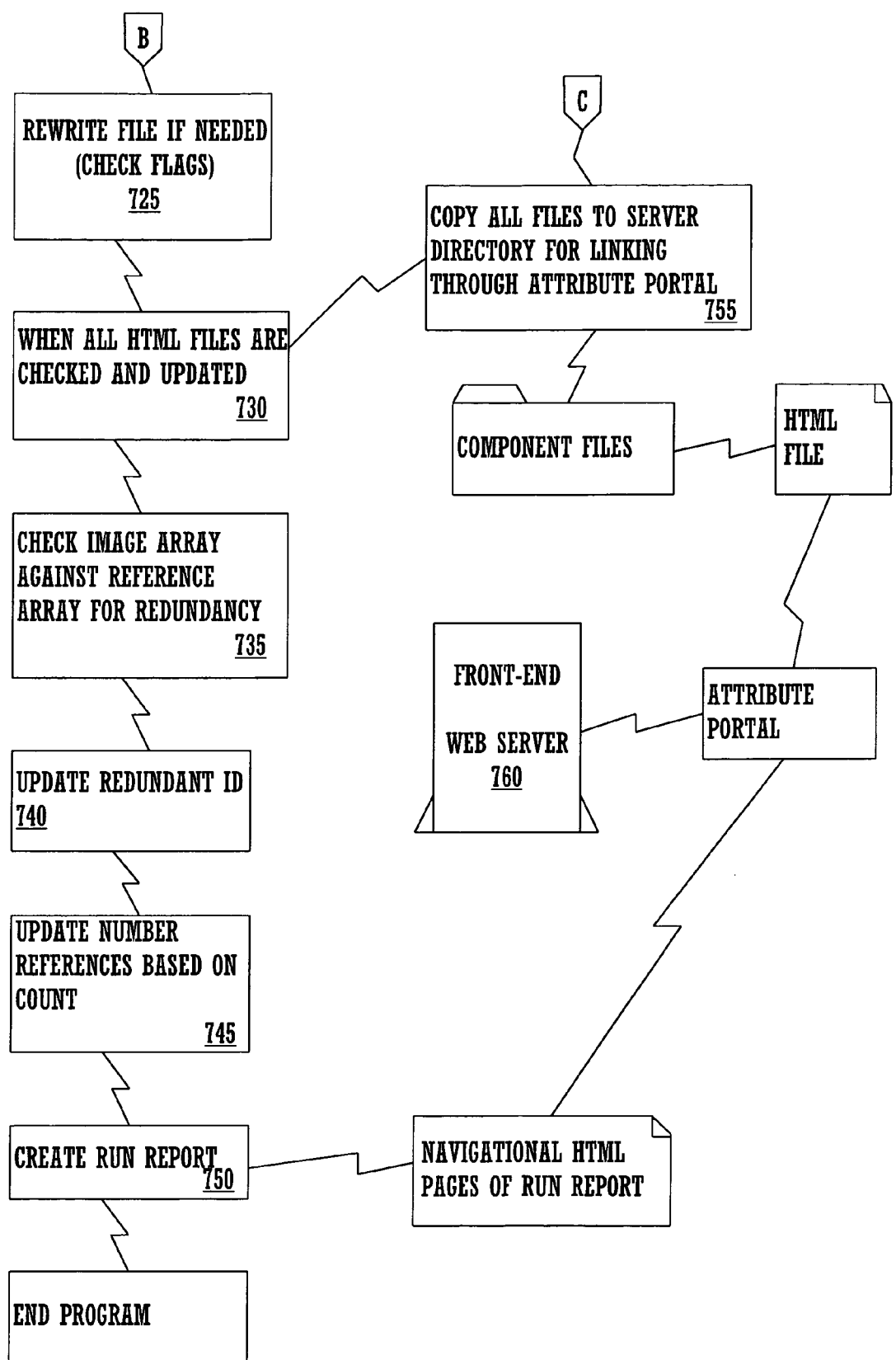

Referring now to FIGS. 6A–6B, a process flow of an alt attribute application (hereinafter referred to as the application) in accordance with one embodiment of the present invention is shown. As depicted in FIG. 6, the application starts by reading 605 an initialization file 610. The initialization file 610 contains specified settings such as: the location of an attribute database, and the structure of the attributed database.

The application connects to the attribute database and acquires and validates data from the attribute database 615. For example, the application will check to see that the file sets and the location of the file sets, as specified in the attribute database, do in fact exist 620. If the data is not valid, the application will report such errors. The application also checks access permissions for the specified file sets if necessary 615. For example, if the file set is located on a source controlled server, the application will check to see whether permission to modify the file set exists. The application will also load the image file names, contained in the attribute database 625, into an image array 630.

The application recursively walks the entire file set looking for HTML files 635. For each HTML file found, the application parses the HTML file for image references 640. For each image reference that is found 645, a number reference counter is incremented 650. For each image reference that is found, the image file name is also stored in a reference array 655. If an image reference is found but the image file does not exist in the file set 60, the application writes the broken reference to the attribute database.

If the image reference is contained in the attribute database 665, the application determines whether the attribute database contains an alt text value for the image reference 670. If the attribute database contains an alt text value, the application determines whether the alt text value in the attribute database is in synch (i.e. the same) with the alt attribute value in the particular image reference in the HTML file 675. If the alt text values are in synch, nothing further needs to be done 680. If the alt text values are not the same, the application sets a corresponding flag 685. The flag indicates that the alt text value contained in the attribute database is to written back to the corresponding HTML file.

Furthermore, if the attribute database does not contain an alt text value, the alt attribute application determines whether the particular image reference in the HTML file has an alt text value specified 690. If an alt text value is specified, the application sets a corresponding flag 695. The flag indicates that the alt text value contained in the HTML file is to be written to the attribute database for the particular image file reference. If the HTML file for the particular image file reference does not have an alt text value, nothing needs to be done 700.

If the image reference is not contained in the attribute database 665, the alt attribute application determines whether the image reference in the HTML file contains an alt text value 705. If there is no alt text value in the particular image reference of the HTML file, the application simply writes the image file name to the attribute database 710. However if there is an alt text value in the particular image reference of the HTML file, the alt attribute application writes the image file name and the alt attribute text value to the attribute database 715.

Once all the image references have been checked 720 according to the above steps, the application writes the necessary data to the attribute database and updates the alt text value in the HTML files according to the various flags 725. If the HTML files are located on a regular file system, the program will simply rewrite the file. If the HTML files are stored on a source control system, the application will read the file first and if necessary, check it out and check it back in after the re-write. The setting of the flags and subsequent batch writing corresponding to the conditions of the flags are utilized to improve the performance of the application.

When all the images are examined according to the above steps 730, all the image files names in the attribute database are compared to the image references that are found in the file set 735. If an image file name in the attribute database is not referenced in the file set, the redundant field in the attribute database gets updated accordingly for each such image 740. Furthermore, the application analyzes the number of image references for each image file, as provided by the number reference counter. The count for each image file is saved in the attribute database 745.

The application is then finished and the content of the attribute database can be stored as a run report 750. A new run cycle can start with traversing the specified file location and recursively finding all HTML files in the file set 635. In an alternative feature of the present embodiment, the application will performs another run cycle, according to a scheduled interval specified by an administrator.

In an alternative feature of the present invention, when all the image references are found and checked 730, the file set is copied 755 so that the file set can be accessed by a server which provides the front-end portal functionality and provides a web server 760. In such a case, the files get updated first and then copied over. Thus, the alt text value in the reference file is up to date as soon as the program finishes. Copying of the file set by the back-end provides for access, by editors and the like, when the original file set is located on a source controlled server. Copying the file set by the back-end also provides for access when the web server is separate from the server on which the back-end is running. Furthermore, one skilled in the art can appreciate that the above-described embodiments of the present invention can be implemented across any number of servers. For example, in an exemplary implementation, the file set is located on a file server 765. The back-end is running on a separate server 770, while the front end is running on a web server 760. Thus, various servers providing for various functionality can be utilized.

Referring now to FIGS. 7A–7C, a user interface for displaying and navigating a run report in accordance with one embodiment of the present invention is shown. Every time an alt attribute application runs against a file set, an HTML run report is created. The HTML run report is then posted on a web server and linked to form within a user interface.

As depicted in FIGS. 7A–7C, the HTML run report is comprised of one or more navigation HTML pages that are updated with every run of the alt attribute application. The navigation HTML pages allow a user to readily drill down into detail reports.

In one implementation, a file set report 805 (top level navigational HTML page) includes information such as the component name 810 and version 815 which identifies each file set, the location of the file set 820, the owner of the file set 825, links to various run reports 830, and the like. A user first selects a file set 845 from the file set report 805 showing the different file sets 840 in the alt attribute application, and thus drills down to a run report 845.

The run report (intermediate level navigational HTML page) 845 includes such information as the various result sets 850 from the alt attribute application running against the selected file set, the number of errors 855, links to various detail reports 860 (low level navigational HTML page), and the like. In the numbers of errors field 855, all of the report of a detail report can be grouped into a single pass/fail entry. From this report, the user can drill down to a detailed report 870 for a particular run by clicking on the appropriate link 865.

The detail report (low level navigation HTML page) 870 includes various sections 875 containing information such as: missing images that are referenced but are not contained in the file set, redundant images that are contained in the file set but are not referenced therein, references wherein no alt text value is specified, references wherein alt text is more than 60 characters long, references wherein the alt text is the same as the image name, and the like. Furthermore, each section contains additional data applicable to the specific section. For example, in the case of references wherein the alt text is the same as the image file name 880, the name of the HTML file 885, the line at which the image reference appears in the particular HTML file 890, the alt text value 895, the image name that is being reference 900, and the like are provided.

Thus the present invention provides all the image file data and alt attribute information right in a navigational set of reports. The navigation reports readily provide a means for drilling down through various levels of detail. In an alternative feature of the present invention, the data contained in the detail report can also provide a link for viewing and editing such data. For example, if an editor wants to modify the alt attribute value in the case of an image reference wherein the alt text value is currently more than 60 characters long 905, the editor may click on a particular image reference 910 to view the image file. The editor can also click on the corresponding line number value 915 to see the context in which the image is used. Then the editor can click on the alt text value 920 to change the current alt text value such that the new value will be less than 60 characters long.

Referring back to FIGS. 1 and 3, in one embodiment of the present invention, an administrator 80 configures an attribute engine. The administrator 80 specifies information about the file sets and schedules the process performed by the attribute engine 20.

The administrator 80 specifies information such as: one or more file set names 315, a version number of each file set 325, a physical location of each file set on a file server 335, an owner of each file set 345, a description of each file set 355, and the like.

The file set name 315 and file set version 325 allow the editor to select the appropriate file set through a graphic user interface. The physical file set location 335 lets the attribute engine 20 know the physical location of the file set on the file server 50. Information such as the owner of the file 345 set, a description of each file set 355, and the like, may also assist an author 60, administrator 80, and or editor 90.

The administrator 80 may also set up a schedule process that will run the attribute engine 20. While the file set is continually updated and image data must be constantly added or deleted from the attribute database 40, the attribute engine 20 will normally only need to run at a specific interval. Scheduling the process performed by the attribute engine 20 enables authors 60, administrators 80, editors 90 and the like to decide how often the attribute engine should run to obtain acceptable synchronization rates and utilization of various server resources.

In an alternative feature of the present invention, the attribute portal may provide access permissions via a login. The login may be used in conjunction with information specified by an administrator to limit access of a particular editor to one or more particular file sets.

Finally, the above-described embodiments of the invention can also be utilized to create and manage an image file repository. Authors can browse the image library to come up with ideas for the graphics they need. This could achieve a more coherent look and feel to file sets. The alt attribute application can be utilized to enforce the existence of alt text and long descriptions. Furthermore, image file naming convention can also be enforced, by utilizing input masks for that particular field.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A computer implemented attribute application, comprising:
    a server, wherein a file set is stored;
    an attribute engine communicatively coupled to the server, wherein an alt attribute value of image data stored in the server is updated based upon the data stored in an attribute database;
    the attribute database communicatively coupled to the attribute engine, wherein image data from the file set is stored; and
    an attribute portal communicatively coupled to the attribute database, wherein the image data is edited.

2. The computer implemented attribute application, according to claim 1 wherein the attribute engine updates the image data stored in the attribute database, based upon the file set stored on the server.

3. The computer implemented attribute application, according to claim 1 wherein the attribute engine is configured by an administrator.

4. A method for updating alt attribute values, comprising:
    a means for updating a data in an attribute database based upon data of an image in a file set;
    a means for editing alt attribute values in the attribute database; and
    a means for updating the file set based upon the alt attribute values in the attribute database.

5. The method for updating alt attribute values, wherein the means for updating the attribute database based upon image data in the file set, according to claim 4 further comprises:
    a means for identifying the image in the data set;
    a means for comparing the data for the image identified in the file set with the data contained in the attribute database.
    a means for updating one or more fields of a record, containing data corresponding to the identified image, in the attribute database when the attribute database contains data for the identified image; and
    a means for adding a record, containing data corresponding to the identified image, in the attribute database when the attribute database does not contain data for the identified image.

6. The method for updating alt attribute values, wherein the means for updating the file set based upon the alt attribute values in the attribute database, according to claim 4 further comprises:
    a means for comparing the alt attribute value in the attribute database with the alt attribute value of one or more corresponding images in the file set;
    means for updating the alt attribute value of the corresponding image in the file set, when the alt attribute value in the corresponding image in the file set does not exist; and
    means for updating the alt attribute value of the corresponding image in the file set, when the alt attribute value in the corresponding image in the file set does not match the alt attribute value in the corresponding record in the attribute database.

7. The method for updating alt attribute values, wherein the means for editing alt attribute values in the attribute database, according to claim 4 further comprises:
    means for identifying the file set;
    means for selecting a query for the file set;
    means for presenting a result of the query; and
    means for editing the alt attribute text value presented in the result of the query.

8. The method for updating alt attribute values, wherein the means for editing alt attribute values in the attribute database, according to claim 7 further comprises:
    means for displaying the image presented in the result of the query.

9. The method for updating alt attribute values, wherein the means for editing alt attribute values in the attribute database, according to claim 7 further comprises:
    means for displaying a context in which the image appears in the file set, presented in the result of the query.

10. A computer-readable medium carrying one or more sequences of instructions which when executed by a computer system cause the computer system to implement a method for updating alt attribute values, comprising:
    updating a data in an attribute database based upon data of an image in a file set;
    editing alt attribute values in the attribute database; and
    updating the file set based upon the alt attribute values in the attribute database.

11. The computer-readable medium carrying one or more sequences of instructions which when executed by a computer system cause the computer system to implement a method for updating alt attribute values, according to claim 10 further comprising:
    identifying the image in the data set;
    comparing the data for the image identified in the file set with the data contained in the attribute database;
    updating one or more fields of a record, containing data corresponding to the identified image, in the attribute database when the attribute database contains data for the identified image; and
    adding a record, containing data corresponding to the identified image, in the attribute database when the attribute database does not contain data for the identified image.

12. The computer-readable medium carrying one or more sequences of instructions which when executed by a computer system cause the computer system to implement a method for updating alt attribute values, according to claim 10 further comprising:
    comparing the alt attribute value in the attribute database with the alt attribute value of one or more corresponding images in the file set;
    updating the alt attribute value of the corresponding image in the file set, when the alt attribute value, in the corresponding image in the file set, does not exist; and
    updating the alt attribute value of the corresponding image in the file set, when the alt attribute value, in the corresponding image in the file set, does not match the alt attribute value in the corresponding record in the attribute database.

13. The computer-readable medium carrying one or more sequences of instructions which when executed by a computer system cause the computer system to implement a method for updating alt attribute values, according to claim 10 further comprising:
    identifying the file set;
    selecting a query for the file set;
    presenting a result of the query; and
    editing the alt attribute text value presented in the result of the query.

14. The computer-readable medium carrying one or more sequences of instructions which when executed by a computer system cause the computer system to implement a method for updating alt attribute values, according to claim 13 further comprising:
    displaying the image presented in the result of the query.

15. The computer-readable medium carrying one or more sequences of instructions which when executed by a computer system cause the computer system to implement a method for updating alt attribute values, according to claim 13 further comprising:
    displaying a context in which the image appears in the file set, presented in the result of the query.

16. The computer-readable medium carrying one or more sequences of instructions which when executed by a computer system cause the computer system to implement a method for updating alt attribute values according to claim 13 wherein presenting the result of the query comprises:
    providing a link to an image file;
    providing a link to a context of the image file; and
    providing an alt attribute editor.

17. The computer-readable medium carrying one or more sequences of instructions which when executed by a computer system cause the computer system to implement a method for updating alt attribute values according to claim 16 wherein presenting the result of the query further comprises:
    providing a link to the current alt attribute.

* * * * *

UNITED STATES PATENT AND TRADEMARK OFFICE
CERTIFICATE OF CORRECTION

| | | |
|---|---|---|
| PATENT NO. | : 6,957,231 B1 | Page 1 of 1 |
| APPLICATION NO. | : 10/173324 | |
| DATED | : October 18, 2005 | |
| INVENTOR(S) | : Jedidja Lubbers and Darren McBurney | |

It is certified that error appears in the above-identified patent and that said Letters Patent is hereby corrected as shown below:

Title Page in Inventors item (75):

Delete "Karen Masterson, Hillsborough, CA (US)"

Signed and Sealed this
Sixteenth Day of July, 2013

Teresa Stanek Rea
*Acting Director of the United States Patent and Trademark Office*